UNITED STATES PATENT OFFICE.

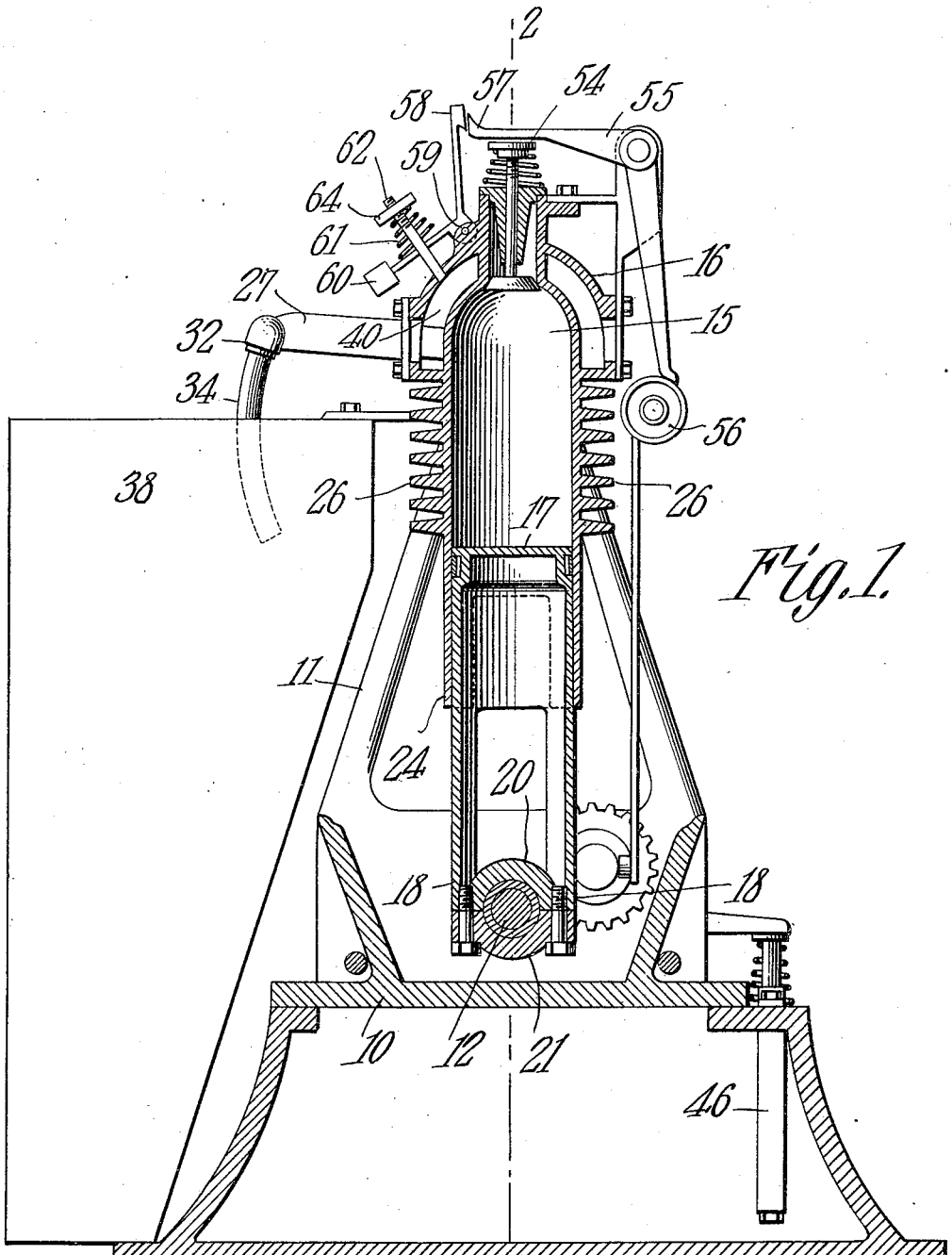

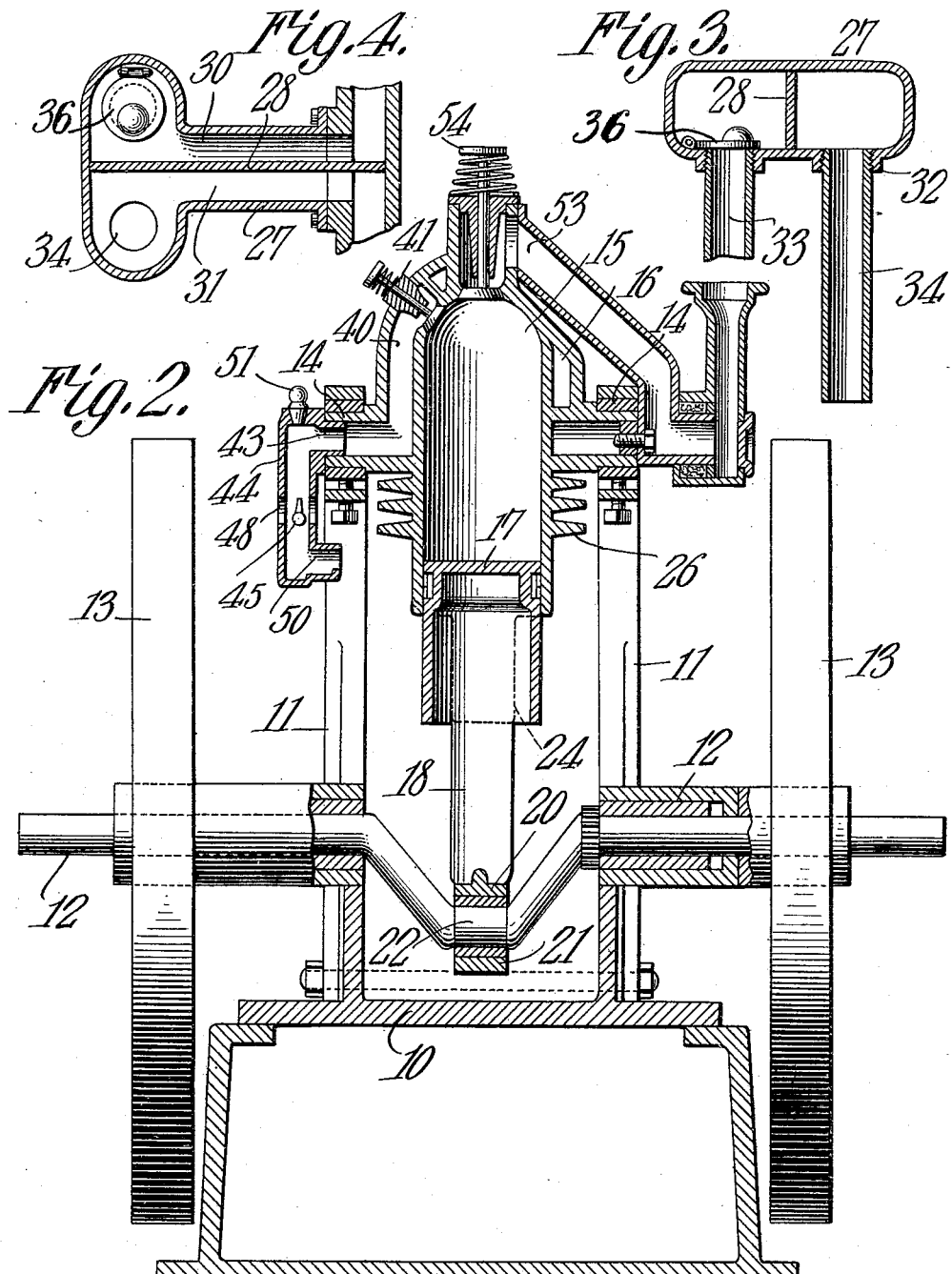

HORACE E. WOOLERY, OF FAIRMONT, MINNESOTA.

INTERNAL-COMBUSTION ENGINE.

990,326.

Specification of Letters Patent.

Patented Apr. 25, 1911.

Application filed January 8, 1908. Serial No. 409,838.

*To all whom it may concern:*

Be it known that I, HORACE E. WOOLERY, a citizen of the United States, residing at Fairmont, in the county of Martin and State of Minnesota, have invented a new and useful Internal-Combustion Engine, of which the following is a specification.

This invention relates to internal combustion engines, and has for its principal object to provide a novel form of engine of the oscillatory cylinder, four-cycle type.

A further object of the invention is to provide a novel means for causing the circulation of water or other cooling fluid around the cylinder or the explosion chamber thereof.

A still further object of the invention is to provide a novel form of inertia governor arranged to lock the exhaust valve in open position when the speed of the engine is abnormally high in order to permit the passage of air alone to the cylinder during the suction stroke, until the speed is reduced to the normal.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of an internal combustion engine constructed in accordance with the invention. Fig. 2 is a transverse sectional view of the same on the line 2—2 of Fig. 1. Fig. 3 is a detail view of the circulating device for the water or other cooling agent. Fig. 4 is a horizontal section through the upper portion of the circulating device shown in Fig. 3.

Similar numerals of reference are employed to indicate corresponding parts throughout the several figures of the drawings.

The engine is mounted on a base 10 which is preferably hollow in order that it may form a reservoir for gasolene or other liquid, to be used in driving the engine.

From the top of the base extend two standards 11 spaced from each other and provided with bearings for the reception of a main crank shaft 12 to which balance or belt wheels 13 of any ordinary construction may be secured.

At the upper ends of the standards are bearings for the reception of hollow trunnions 14, which extend from the oscillatory cylinder 15, the trunnions preferably forming an integral part of the cylinder, and its cooling jacket 16. Arranged within the cylinder is a piston 17, the opposite side walls of the piston being extended in the form of arms 18 which are connected at their lower ends to form an upper box 20, which, in connection with a cap 21, forms a bearing for the crank pin 22. The opposite side walls of the cylinder are also extended in the form of arms 24 that form guides for the arms 18 and which extend close to the crank pin in order to form elongated bearings or supports for the piston and prevent uneven wear from the lateral thrust due to the movement of the crank pin and the oscillatory cylinder.

The cylinder proper is surrounded by heat radiating ribs 26, while the upper portion or explosion chamber of the cylinder is surrounded by a jacket 16 as before described, and with this jacket communicates a pipe 27 in which is arranged a centrally disposed partition 28 that extends, also, across the jacket space, the passage 30 at one side of the partition being arranged for the inflow of the water, while the passage 31 at the opposite side of such partition permits the discharge of the heated water.

At the outer end of the pipe 27 is secured a casing or coupling 32, from which depend two pipes 33 and 34, said pipes being arranged on arcs that are struck from the axes of the trunnions. At the upper end of the pipe 33 is a one-way check valve 36 which opens upward to permit the passage of water from the pipe 33 to the passage 30. The other passage-way is free for the discharge of the water.

At one side of the engine frame is arranged a water tank 38 having openings at the top for the passage of the pipes 33 and 34. This tank is kept filled with water or other fluid, and as the engine oscillates, and the two pipes 33 and 34 are forced down into the liquid, a continuous circulation of the liquid may be maintained upward through pipe 33, past valve 36, through passage 30 around the water jacket and out through the passage 31 and pipe 34 to the tank, the oscillation of the cylinder itself being taken advantage of to secure circulation of the cooling fluid. The length of the pipe 34 is such that it is always immersed in the water. Before starting the operating of the engine, the pipe 34 must be primed in order that the circulation through the water jacket may be obtained. Another way to effect this is to locate the check valve 36 so that it is immersed in the water.

Each of the frames is hollow, and with one of them communicates an inlet passage 40 in which is arranged a valve 41, normally closed by a suitable spring, said valve being of the suction inlet type that opens during the suction stroke of the piston to permit the inflow of the charge. Fitting into the end of the trunnion is a nipple 43 that projects from one side of the casing 44 adjacent to and supported by one of the standards 11. Into this casing extends a nozzle 45 to which gasolene is forced from a suitable pump 46 that is operated in any desired manner from the engine, and the spray of gasolene is intermingled with air which may enter through ports 48 in the casing in order to form an explosive mixture which passes through the hollow trunnion and port 40 to the cylinder.

In order to heat the fuel mixing device for starting purposes, the lower part of the casing 44 is provided with a recess 50 into which a quantity of gasolene may be poured, and in the top of the casing is a removable plug 51 which may be raised for the purpose of igniting the gasolene, so that the mixture may be initially heated before the engine starts into operation.

The exhaust port 53 is under the control of a valve 54. The stem of this valve is operated upon by a lever 55, one arm of which is actuated by a cam 56. The free end of the lever 55 has a toe 57 which may be engaged by the hooked shaped end 58 of a governor.

The governor comprises a two-armed lever pivoted on a stud 59 at the head of the cylinder, and that arm of the lever opposite the hook 58 is provided with a weight 60 that tends normally to keep the hook out of engagement with the toe 57, and this movement is assisted by a compression spring 61 surrounding a stem 62 that projects from the engine casing, the outer end of the spring bearing against a nut 64 that is adjustably mounted on a threaded portion of the stem. By turning this nut, the sensitiveness of the governor may be adjusted.

It is obvious that as the oscillatory movement of the engine increases in speed, the weight 60 being thrust in one direction by the acquired momentum will tend to move the hook 58 over the toe 57 in case the speed of the engine is excessive, and when this occurs the exhaust valve will be locked in open position and air will be sucked into the cylinder during one or two complete revolutions until the speed of the engine is reduced to the normal.

I claim:—

1. An internal combustion engine including an oscillatory cylinder having a water jacket, a pumping device mounted upon the cylinder and a tank located in the path of movement of the pumping device.

2. An oscillatory engine having a water jacket, a water inlet pipe extending therefrom, and a water tank into which the end of the pipe dips.

3. An engine having an oscillatory cylinder provided with a water jacket, an inlet pipe communicating with the jacket and movable with the cylinder, said pipe having a one-way valve, and a water tank into which the end of the pipe dips.

4. An engine having an oscillatory cylinder provided with a water jacket, a water inlet pipe connected to the jacket, and movable therewith, a valve in said pipe, a water tank into which the pipe dips, and a water discharge pipe also leading from said jacket.

5. An engine having an oscillatory cylinder provided with a water jacket, a partitioned pipe leading therefrom, a casing connected to the outer end of said pipe, a pair of pipes leading from the casing and arranged on arcuate lines struck from the center of oscillation of the cylinder, one of said pipes having a check valve, and a water tank into which the pipes extend.

6. An engine having an oscillatory cylinder provided with a water jacket, a water tank located to one side of the cylinder in the plane of its oscillation, and pipes leading from the water jacket into the tank, one of said pipes containing a check valve and swinging with the cylinder, said pipe extending into the contents of the tank.

In testimony that I claim the foregoing as my own, I have hereto affixed my signature in the presence of two witnesses.

HORACE E. WOOLERY.

Witnesses:
J. E. PALMER,
R. W. PALMER.